United States Patent Office 3,109,972
Patented Nov. 5, 1963

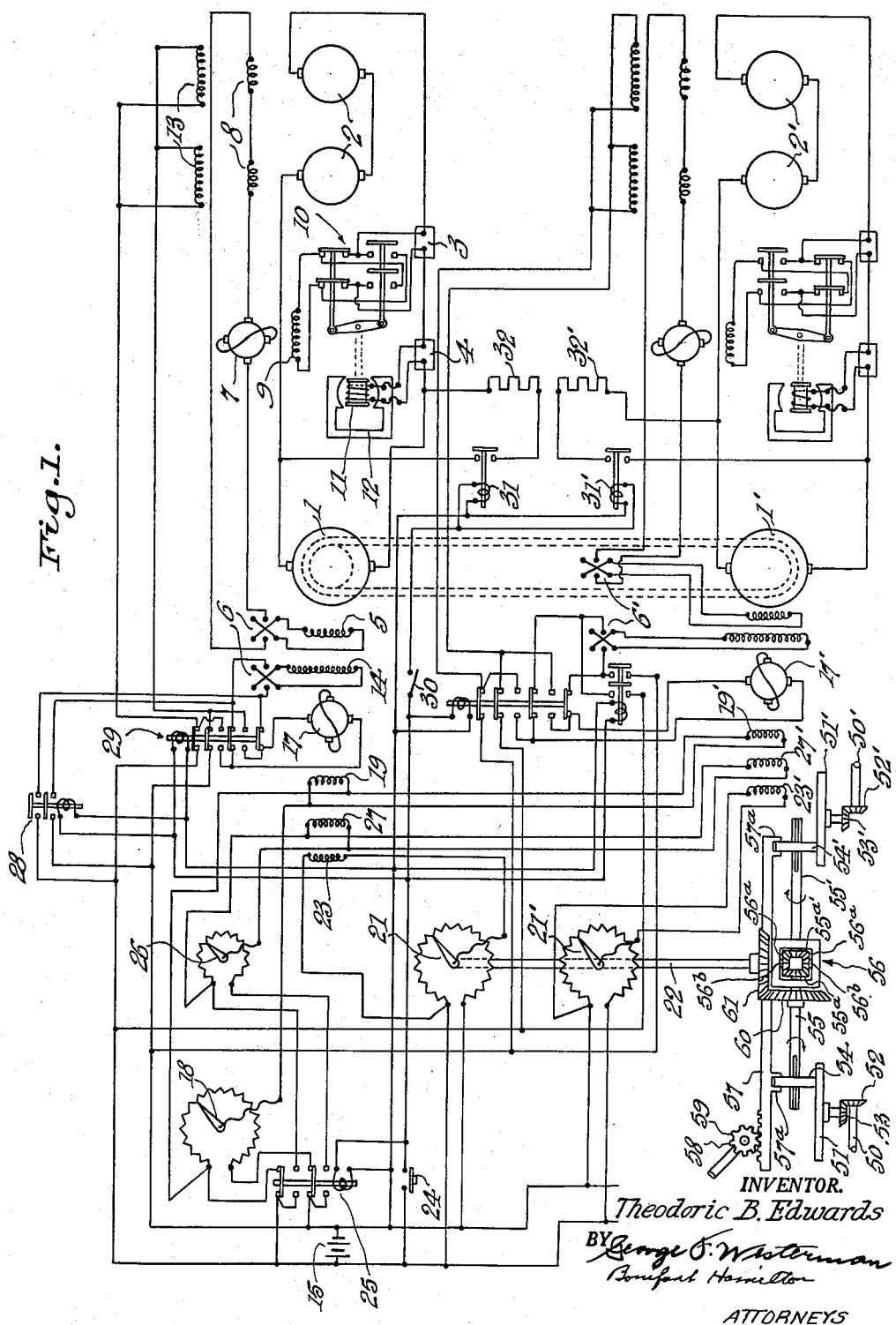

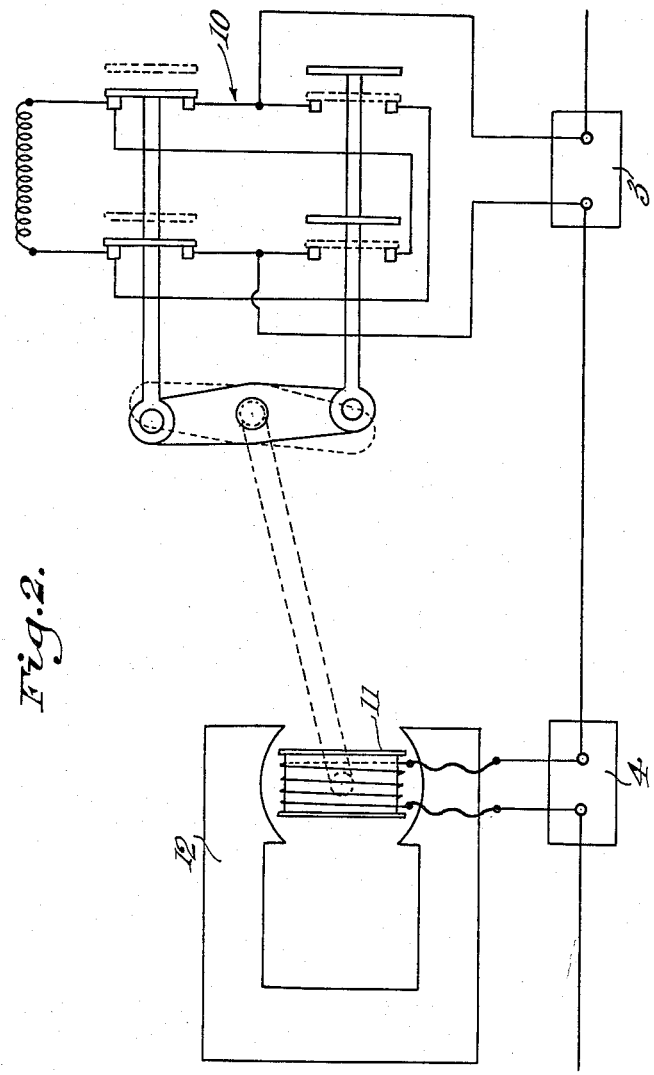

3,109,972
PLURAL GENERATOR FED MOTOR CONTROL SYSTEM
Theodoric B. Edwards, 5311 Neptune Drive, Alexandria, Va.
Filed Oct. 3, 1961, Ser. No. 142,746
5 Claims. (Cl. 318—55)
(Granted under Title 35, U.S. Code (1952), sec. 266)

The invention described herein may be manufactured and used by or for the Government for governmental purposes without the payment of any royalty thereon.

The present invention relates to the field of electric motor control systems and particularly to systems designed to control the motor drive of track or wheeled, self-propelled vehicles.

The power systems for some self-propelled vehicles comprise an internal combustion engine arranged to drive two separate generators each of which supplies current to a group of electric motors driving the track or wheels on its respective side of the vehicle. Under certain operating conditions (e.g., braking, turning, running downhill) the roles of the generator and motors on one or both sides of the vehicles may be exchanged and the motors may operate as generators. This exchange of roles may be useful as for dynamic braking.

Compound-wound motors have some characteristics which suit them to use in self-propelled vehicles. Their torque is greater for a given current than the shunt type motor and unlike the series type motor they will generate current (and so act as dynamic brakes) when driven above motor speed in the same direction. However certain problems inhere in the use of compound motors which unless overcome limit the maneuverability of any vehicle which they power. If a conventional series connection is made between the armatures and the series field windings of the motors, when the armature current is reversed the series field opposes the shunt field. Unstable operation results. This difficulty can not be effectively eliminated by employing conventional reversing contactors which would interrupt full armature current. The frequent reversals of armature current incident even to normal operation would cause breakdowns and maintenance difficulties.

Accordingly, it is the general object of this invention to provide an improved electric motor control system of great flexibility which is reliable, easy to operate, has a very rapid rate of response and one especially adapted to the operation of self-propelled vehicles such as tractors and military tanks.

Another object of the invention is to provide an electric motor control system having a generator and compound-wound motors whose armatures are connected in series and in which the series field windings of each of the motors is excited by a current directly proportional to the armature current but whose direction is not reversed when the direction of the armature current is reversed.

The invention as applied to self-propelled vehicles comprises two compound-wound, direct current generators mechanically coupled to each other and to a prime mover. The armature of each generator is connected in series to the armatures of one or more compound-wound electric motors. The control circuits for both of the generator-motor groups are substantially identical and, except for speed and braking controls, are substantially independent of each other. In each generator-motor group the series field windings are connected in series to each other and are excited by a current which, through suitable means, is maintained proportional to the armature current but constant in direction despite reversal of the armature current. Means are provided to regulate the current in the shunt field windings of the motors and generators to effect the speed, torque and direction of the motors thus controlling the acceleration, braking, reversing and turning of the vehicle.

For a complete understanding of the invention and an appreciation of its advantages, reference should be made to the specification which follows and to the accompanying drawings in which:

FIG. 1 is a circuit diagram of the preferred embodiment of the electric motor control system; and FIG. 2 is a circuit diagram of one of the polarizing relays showing more clearly the preferred means for exciting the series field windings of each generator-motor group.

Referring to the drawings, compound-wound, direct current generators 1 and 1' are mechanically coupled to each other and to a conventional internal combustion engine prime mover (not shown). The armatures of compound-wound, direct current motors 2, which drive the left track or wheel group, are connected to each other in series and, through shunts 3 and 4, to the armature of generator 1. (The circuitry associated with generator 1' and motors 2' which drive the right track or wheel group will not be described insofar as it is identical to that associated with generator 1 and motors 2.) The series field windings 8 of motors 2 are connected to each other in series through the armature of amplidyne 7 and reversing switch 6 to the series field winding 5 of generator 1. The means for driving amplidyne 7 is not shown. The amplidyne might be mechanically coupled to the prime mover or it might be driven by a motor powered by the vehicle's battery. Field winding 9 of amplidyne 7 is excited by current picked off the generator-motor armature loop at shunt 3. Thus the current in the series field windings 8 of motors 2 is proportional to the armature current. The current from shunt 3 to field winding 9 flows through one group or another of the contacts of reversing relay 10. Movable coil 11, which is mechanically coupled to reversing relay 10, is mounted between the poles of permanent magnet 12. The coil is energized by current picked off the generator-motor armature loop by shunt 4. When, during operation, the direction of the current in the generator-motor armature loop is reversed, the magnetic field set up around moving coil 11 is reversed. The moving coil realigns itself with reference to the field of permanent magnet 12 actuating reversing relay 10. Thus the current in field winding 9 does not reverse itself to correspond to the current flowing in the generator-motor armature loop but continues to flow in the same direction as when the motors operate as motors. Shunt field 13 of motors 2 and shunt field 14 of generator 1 are separately excited in a manner to be explained hereafter. The principal advantage of the method of exciting the series windings of the motors described above is that inasmuch as the current moving through them never changes direction there is no tendency for the flux created by those windings to oppose the flux created by the shunt windings or to break down the residual magnetism of the field. Hence operation is more stable and the motors are more responsive to the maneuver requirements of the vehicle.

When the vehicle is being driven in a forward or a reverse direction or when it is being turned, motor shunt fields 13 are excited by battery 15 and generator shunt field 14 is excited by exciter 17. The means for driving exciter 17 is not shown.

The speed of the vehicle is controlled by potentiometer 18 which regulates the current flowing from battery 15 to speed control fields 19 and 19' of exciters 17 and 17'.

The direction of travel of the vehicle is reversed by throwing the reversal switches 6 and 6' which reverses the current direction in the series and shunt field windings of each generator and its associated motors.

Reference is now made to the steering mechanism which controls the setting of steering potentiometers 21 and 21' and through them the voltage across steering field windings 23 and 23' of exciters 17 and 17'. The steering potentiometers 21 and 21' are both coupled to shaft 22 in such a manner that when shaft 22 is rotated the voltage to one steering field is decreased while the voltage to the other steering field is increased at a corresponding rate, causing the motors on one side of the vehicle to be driven faster than the motors on the other side and thus turning the vehicle. Shaft 22 is mechanically linked to the operator's steering control and to both tracks or wheel groups in a manner which will be made clear later in this explanation. The setting of the steering potentiometers 21 and 21' may be changed in response to a movement of the operator's steering control or the setting of the steering potentiometers may be changed automatically in response to road conditions which causes one track or wheel group to move faster than the other track or wheel group. In this event an automatic adjustment of the steering potentiometers will counteract the turning tendency of the vehicle by speeding up the opposite track or wheel group.

At this point, it should be remarked that because generators 1 and 1' are mechanically coupled together and since the motors associated with each generator will themselves act as generators when overspeeded and will drive their generator, the motoring generator will assist in driving the other generator hence effecting an economy in operation.

For dynamic braking the direction of the current in the generator-motor groups must be reversed so that the motors act as regenerative brakes (i.e., generators). During dynamic braking, the motor shunt fields 13 are connected to exciter 17 and the generator shunt field 14 is connected to the battery 15. Action to bring about the necessary changes in connections is initiated when the operator throws the brake application switch 24. Relay 25 is actuated breaking the connection between speed control potentiometer 18 and battery 15 and substituting a connection from battery 15 through dynamic brake potentiometer 26 to braking field windings 27 and 27' of exciters 17 and 17'. The coils of relays 28 and 29 are also energized when brake application switch 24 is engaged. Relay 28 is actuated completing the connection between battery 15 and generator shunt field 14. Simultaneously, relay 29 is actuated breaking the existing connections between motor shunt fields 13 and battery 15 and between generator shunt field 14 and exciter 17 substituting therefor a connection between exciter 17 and motor shunt fields 13. A similar switching of connection occurs on the other side of the vehicle upon the application of brake switch 24. The motors now operate as generators and the generators as motors utilizing the braking effect of the engine as in a direct drive vehicle.

If during dynamic braking the prime mover is overspeeded, centrifugal switch 30 is closed completing a circuit between battery 15 and the coils of relays 31 and 31'. When relays 31 and 31' are actuated, dynamic braking resistors 32 and 32' are connected across their respective generator-motor armature loops. The dynamic braking resistors will dissipate excessive current being generated by the motors.

During the dynamic braking operation the vehicles can be steered in the normal manner through the action of steering potentiometers 21 and 21'.

Returning now to the steering mechanism which controls steering potentiometers 21 and 21', motion of the left track or wheel group is transmitted to the mechanism by shaft 50 and bevel gear 52 which is attached to that shaft. Gear 52 turns friction plate 51 through bevel gear 53. Friction wheel 54 which rides on and is rotated by friction plate 51 is slidably splined on shaft 55. Shaft 55 is attached to and turns bevel gear 55a of differential gear 56. Thus bevel gear 55a is driven by shaft 50; the relative speeds of the gear and the shaft will vary according to the position of friction wheel 54 on friction plate 51. Given a constant speed in shaft 50, the speed of bevel gear 55a will be decreased the closer friction wheel 54 moves to the center of friction plate 51.

Bevel gear 55a' of differential gear 56 is driven in a direction opposite to that of bevel gear 55a by the right track or wheel group through shaft 50', gears 52' and 53', friction plate 51', friction wheel 54' and shaft 55', whose construction and operation are generally similar to the construction and operation of the parts linking the left track or wheel group with bevel gear 55a.

The spur gears 56a of differential gear 56 are rotatably mounted on stud shafts 56b which are affixed to the housing of differential gear 56. Also affixed to that housing is bevel gear 60 which through gear 61 drives shaft 22.

The position of friction wheels 54 and 54' on plates 51 and 51' can be controlled by the operator. The turning of the steering wheel (not shown) causes bar 57 to be moved to the right or to the left by means of pinion 58 and rack 59. Jaws 57a move friction wheels 54 and 54' across the faces of their associated friction plates in one instance towards the center of the plate and in the other instance the same distance toward the perimeter of the plate.

When the vehicle is moving straight ahead or straight backwards, the steering action is as follows: before the operator begins his turn, bar 57 is centered, friction wheels 54 and 54' are equidistant from the centers of friction plates 51 and 51' respectively. Since the tracks or wheel groups on both sides of the vehicle are moving at the same speed, shaft 55 and 55' are turning at the same rate in opposite directions. The housing of the differential remains stationary and no motion is transmitted to shaft 22. When the operator turns the steering wheel to effect a turn to the right, bar 57 moves to the left of the position which it occupies in the drawing. Friction wheel 54' being closer to the outer perimeter of its friction plate than is friction wheel 54 rotates faster than the latter friction wheel. The output of the differential gear is transmitted through gears 60 and 61 to shaft 22 which changes the settings of potentiometers 21 and 21' so that voltage to steering field 23 is increased while voltage to steering field 23' is decreased a corresponding amount. Through the resulting action of their respective exciters and generators the motors on the left side of the vehicle are speeded up while those on the right side of the vehicle are slowed down. The vehicle then begins a turn toward the right. With the vehicle turning toward the right, the rotation rate of shaft 50' decreases while that of shaft 50 increases. Hence the turning rate of plate 51' increases while that of plate 51 decreases a correspondent amount. When the rate of turn reaches the point where the superior rotation rate of plate 51 causes friction wheel 54 to move at the same rate of speed as friction wheel 54', than the differential gear ceases to produce an output. Shaft 22 and potentiometers 21 and 21' have reached a stable position which they continue to occupy throughout the turn until the operator imparts further motion to the steering wheel.

From the foregoing description of a turn to the right and the drawings, the manner of effecting a turn to the left will be readily understood.

The steering potentiometers 21 and 21' effect a turn by slowing or bringing to a stop the track or wheel group on one side of the vehicle while speeding up the track or wheel group on the other side. If it is desired to effect a more sudden turn, reversing switch 6 or 6' may be thrown to cause the track or wheel group associated with that switch to run in a reverse direction.

The steering mechanism previously described for changing the settings of potentiometers 21 and 21' will not be effective when the vehicle is at a standstill since bevel gears 55a and 55a' of the differential gear are not turning. A conventional method of overriding the described steering mechanism and so changing the settings of steering potentiometers 21 and 21' may be provided for turning the vehicle from a standstill. Of course a turn can be started from a standstill by utilizing reversing switches 6 or 6' as appropriate.

One great advantage of the steering mechanism and steering potentiometer combination which has been described is that it will operate automatically to slow down one track or wheel group while speeding up the other track or wheel group to compensate for variations in the roadway which have affected the speed relationships of the tracks or wheel groups. For example, if the right track or wheel group is made to run faster by some defect in the roadway, bevel gear 55a' is driven faster than is bevel gear 55a. Differential gear 56 produces an output and varies the settings of potentiometers 21 and 21' resulting in the motors which drive the left track or wheel group being speeded up while those which drive the left track or wheel group are slowed down. When the differential gear is returned to the condition of stable operation, the steering potentiometers return to their original setting.

Many obvious changes and modifications in design may be made in the electric motor control system described, or in parts of it, and the system, or parts of it, may be used for other obvious purposes besides those enumerated without departing from the principle of the invention.

I claim:

1. In an electric motor control system having a prime mover, a compound-wound, direct current generator driven thereby, a plurality of compound-wound, direct current motors whose armatures are connected in a first series loop circuit with each other and with the armature of said generator and separate means for variably exciting the shunt fields of said generators and said motors, the combination comprising a separate second series loop circuit connecting the series field windings of said generator and said motors to each other; means responsive to the current in the first series loop circuit for exciting the said series field windings with a current proportional to the current in the armatures of said motors; and means responsive to the current in the first series loop circuit for maintaining the current in said series field windings in a constant direction despite a reversal of current in the armatures of said motors.

2. In an electric motor control system having a prime mover, a compound-wound, direct current generator driven thereby, a plurality of compound-wound, direct current motors whose armatures are connected in a first series loop circuit with each other and with the armature of said generator and separate means for variably exciting the shunt fields of said generators and said motors, the combination comprising; an amplidyne connected in a separate second series loop circuit with the series field windings of said generator and said motors; means responsive to the current in the first series loop circuit for exciting the field winding of said amplidyne with current smaller than but proportional to the current in the armatures of said motors; and means responsive to the current in the first series loop circuit for maintaining the current in the field winding of said amplidyne in a constant direction despite a reversal of the current in the armatures of said motors.

3. The electric motor control system described in claim 2 wherein the means for exciting the field winding of said amplidyne comprises a shunt connected in the generator-motor armature loop circuit and the means for maintaining the current in the field winding of said amplidyne in a constant direction comprises a polarizing relay.

4. The electric motor control system described in claim 3 wherein said shunt is connected through a reversing switch to the field winding of the amplidyne; and wherein the polarizing relay comprises a magnet, a movable coil mounted between the poles of said magnet and coupled by suitable mechanical linkage to said reversing switch, a second shunt connected in the generator-motor armature loop circuit, said second shunt connected to said movable coil, whereby when the direction of current in the generator-motor armature loop circuit is reversed the said movable coil turns and actuates the said reversing switch thereby maintaining the current in the field winding of the amplidyne in its original direction.

5. A vehicle drive and control system comprising; a prime mover; a compound-wound, direct current generator and a plurality of compound-wound, direct current motors for driving one track of a vehicle, and a similar generator-motor group for driving an opposite track of the vehicle, the armatures of the generator and motors within each of said generator-motor groups connected to each other in a first series loop circuit and the generators mechanically coupled to each other and to the prime mover; the series field windings of the generator and motors of each generator-motor group connected in a separate second series loop including an amplidyne; means for exciting the field winding of each amplidyne with a current smaller than but proportional to the current in the armatures of the motors which it serves; means for maintaining the current in the field windings of each amplidyne in a constant direction despite reversal of the current in the armatures of the motors it serves; a first exciter means which selectively excites the shunt field windings of the motors and the shunt field windings of the generators; an exciter generator having a speed field winding, a braking field winding, and a steering field winding, associated with each of said generators which selectively and alternatively with the first exciter means excites the shunt field windings of its generator and the shunt field windings of its associated motors; a reversing switch for simultaneously reversing the current in the series fields and the shunt fields of the generator and motors in each generator-motor group; brake application means connected to each exciter generator and to the first exciter means for changing excitation in generator and motor shunt field windings; means for exciting the speed, braking, and steering field windings of each exciter generator; a potentiometer connected across the speed field windings of both said exciter generators to regulate the voltage thereof; a potentiometer connected across the braking field windings of both said exciter generators to regulate the voltage thereof; steering means for simultaneously increasing the voltage across the steering field winding of either of said exciter generators while decreasing the voltage across the steering field winding of the other exciter generator, the said steering means including two potentiometers, mechanically responsive through the output of a differential gear to the relative speeds of the two tracks of the vehicle and to the action of a steering device.

References Cited in the file of this patent
UNITED STATES PATENTS

| 2,424,121 | Schlapfer | July 15, 1947 |
| 2,962,642 | Brane | Nov. 29, 1960 |

FOREIGN PATENTS

| 688,472 | France | Aug. 23, 1930 |